United States Patent Office
3,732,288
Patented May 8, 1973

3,732,288
DIFLUOROAMINO COMPOUNDS
Clifford L. Coon, Fremont, Marion E. Hill, Palo Alto, and Donald L. Ross, Menlo Park, Calif., assignors to the United States of America as represented by the Secretary of the Navy
No Drawing. Filed Mar. 10, 1970, Ser. No. 23,106
Int. Cl. C07c 69/54, 69/62
U.S. Cl. 260—486 H    8 Claims

ABSTRACT OF THE DISCLOSURE

Compounds of the formula

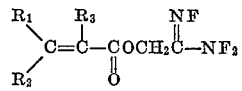

are produced by the following reaction sequence:

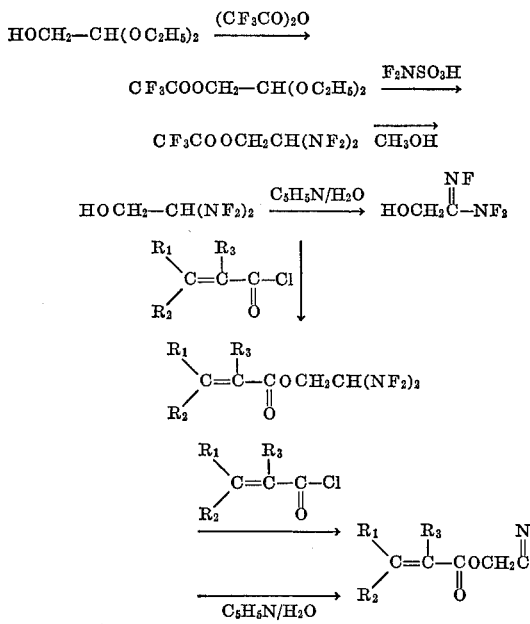

where $R_1$, $R_2$ and $R_3$ vary independently and represent H and lower alkyl. These compounds are used to produce polymers which are used in propellant binders.

BACKGROUND OF THE INVENTION

This invention relates generally to chemical compounds and their production, and more particularly to esters of unsaturated carboxylic acids and N,N,N'-trifluorohydroxyacetamidine. The binders used in propellant compositions can have a great effect on the specific impulse and burning rate of the composition. In the past, it has been known to use esters of unsaturated carboxylic acids as monomers to prepare polymers which functioned well as binders in propellant compositions. However, the search has gone on to find other polymers which will give a high specific impulse and fast burning rate. More specifically, this search has led to the synthesis of new monomers which can be converted to polymers which possess the hereinbefore described characteristics.

SUMMARY OF THE INVENTION

Accordingly, one object of this invention is to provide new chemical compounds and intermediates for the production thereof.

Another object of this present invention is to provide monomers which can be converted to polymers by using conventional polymerization techniques.

Another object of this invention is to provide monomers which can be converted to polymers useful as binders in propellant compositions.

A still further object of the instant invention is to provide monomers which can be converted to polymers which, when used as binders in propellant compositions, aid in achieving high specific impulses and fast burning rates.

Another still further object of this invention is to provide a synthesis for the preparation of the monomers.

These and other objects of this invention are accomplished by providing monomers of the formula

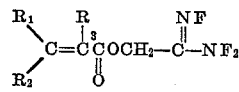

wherein $R_1$, $R_2$ and $R_3$ vary independently and can each be H or lower alkyl, which are prepared either by reacting

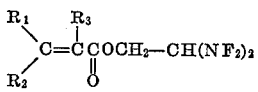

with pyridine and water or by reacting

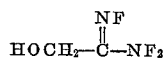

with

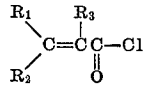

under esterifying conditions.

DESCRIPTION OF THE PREFERRED EMBODIMENT

The monomers of this invention, which can be converted into polymers by using any art recognized technique, are represented by the formula

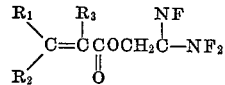

where $R_1$, $R_2$ and $R_3$ all vary independently and can represent H or lower alkyl. The synthesis of these compounds can be outlined by the following scheme:

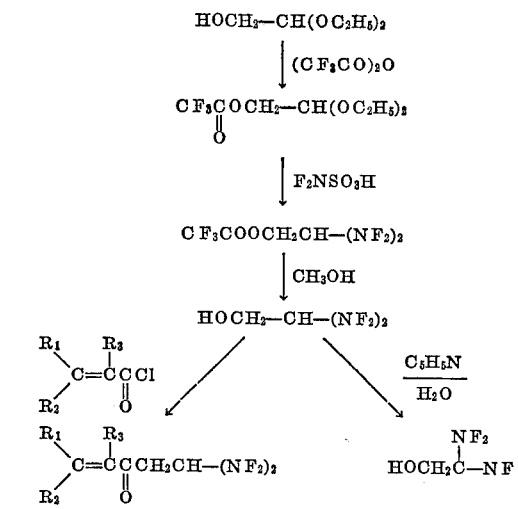

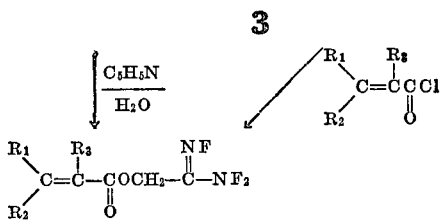

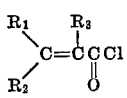

Glycolaldehyde diethyl acetal is first reacted with trifluoroacetic anhydride in a conventional esterification reaction to obtain 2-trifluoroacetoxyacetaldehyde diethyl acetal which is then further reacted with difluorosulfamic acid to obtain replacement of the ethoxy group by —NF$_2$ groups.

To obtain 2,2-bis(difluoroamino)ethanol from the trifluoroacetic acid ester of the alcohol one merely transesterifies with methanol and obtains the free alcohol.

Once the alcohol is obtained it is possible to synthesize the desired products in one of two ways. One can either react the alcohol with the corresponding acid chloride of the formula

to obtain the ester and then react the ester with pyridine and water to form the trifluoroguanyl group or alternately one can first form the trifluoroguanyl group on the alcohol and subsequently react this with the corresponding acid chloride.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

2-trifluoroacetoxyacetaldehyde

Diethyl acetal—CF$_3$COOCH$_2$CH(OC$_2$H$_5$)$_2$

To a stirred suspension of 5.30 g. (0.05 mole) of anhydrous sodium carbonate in 40 ml. of methylene chloride at 5° C. was added dropwise a solution of 10.50 g. (0.05 mole) of trifluoroacetic anhydride in 10 ml. of methylene chloride. To this mixture was added, portionwise and with stirring, a solution of 5.36 g. (0.04 mole) glycolaldehyde diethyl acetal in 10 ml. of methylene chloride while the reaction temperature was maintained at 10° C. The reaction mixture was heated to reflux temperature (ca. 39° C.) for one hour, cooled and filtered. The filtrate was evaporated in vacuo at 25° C., leaving 7.38 g. of clear oil containing 93% of the desired product as shown by GLC analysis. The oil was distilled under reduced pressure, and the fraction collected at 42° C. (3.2 mm. Hg) was 99% pure, $n_D^{20} = 1.3773$.

The pure product is also obtained by washing a methylene chloride solution of the compound with water to dissolve the water soluble starting material. The methylene chloride solution is dried and evaporated to give more than a 99% pure product.

Analysis.—Calcd. C$_8$H$_{13}$O$_4$F$_3$ (perecnt): C, 41.74; H, 5.69. Found (percent): C, 41.73; H, 5.82.

EXAMPLE 2

2,2-bis(difluoroamino)ethyl trifluoroacetate

CF$_3$COOCH$_2$CH(NF$_2$)$_2$

A previously prepared mixture of 0.13 mole of difluorosulfamic acid in 16.8 ml. of 100% sulfuric acid and 20 ml. of fluorotrichloromethane was stirred vigorously under a nitrogen atmosphere and was cooled to 0–5° C. To this mixture was added dropwise over a 20 minute period a solution of 4.8 g. (0.021 mole) of 2-trifluoroacetoxyacetaldehyde diethyl acetal in 20 ml. of fluorotrichloromethane. The reaction mixture was warmed to ambient temperature over a 2 hour period and then stirred for 15 hours, giving a pale yellow, two-phase mixture. The mixture was then poured slowly, with stirring, into 200 ml. of crushed ice and water. The organic phase was separated, and the aqueous phase was extracted once with 35 ml. of fluorotrichloromethane. The organic phases were combined and washed with three 50 ml. portions of water, dried with magnesium sulfate, filtered and evaporated in vacuo to give 1.3 g. of clear, colorless liquid. This material was distilled at 65° C. (95 mm. Hg) to give the desired product in 98% purity, as shown by GLC $n_D^{25} = 1.3305$, the structure was confirmed by NMR and IR analyses.

Calcd. C$_4$H$_3$N$_2$O$_2$F$_7$ (percent): C, 19.68; H, 1.24; N, 11.48. Found (percent): C, 19.96; H, 1.45; N, 11.54.

EXAMPLE 3

2,2-bis(difluoroamino)ethanol

HOCH$_2$CH(NF$_2$)$_2$

To 3.83 g. (0.016 mole) of crude 2,2-bis(difluoramino) ethyl trifluoroacetate in 2 ml. of methylene chloride was added 1.00 g. (0.032 mole) of methanol at ambient temperature. As transesterification occurred, the temperature rose about 10° C. After stirring for one hour at ambient temperature, the mixture was heated to 40° C. for one hour to complete the reaction. The progress of the reaction was conveniently followed by GLC using an SE–30 column at 100° C. When the reaction was completed, the methylene chloride, methyl trifluoroacetate, and most of the excess methanol were removed in vacuo, leaving 1.38 g. of a colorless, cloudy liquid which contained 80% 2,2-bis(difluoroamino) ethanol with methanol and water as impurities. The product was purified by short path distillation which gave 0.91 g. of product at 55–60° C. (9 mm. Hg). A lower boiling fraction contained an azeotropic mixture of methanol and 2,2-bis(difluoramino)ethanol boiling at 45–50° C. (15 mm. Hg). When stored in glass, the product, a colorless liquid, slowly decomposed by losing HF; the structure was confirmed by NMR and IR analyses.

EXAMPLE 4

2,2-bis(difluoroamino)ethyl acrylate

CH$_2$=CHCOOCH$_2$CH(NF$_2$)$_2$

To 1.38 g. (0.0093 mole) of 2,2-bis(difluoramino)ethanol was added 1.50 g. (0.017 mole) of acrylyl chloride, and the resulting solution was allowed to stir at ambient temperature for three hours. The progress of the reaction was followed by GLC using a 5 foot SE–30 column at 100° C. When all of the alcohol had reacted, the excess acrylyl chloride was removed in vacuo, leaving 1.7 g. (91% yield) of a cloudy, colorless liquid. A small amount of the product was purified by preparative GLC, giving a clear, colorless liquid. This was identified as the desired product by NMR and IR analyses.

EXAMPLE 5

N,N,N'-trifluorohydroxyacetamidine acrylate

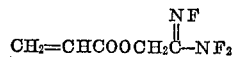

A solution of 0.50 g. (0.0025 mole) of 2,2-bis(difluoramino) ethyl acrylate in 2.0 ml. of methylene chloride was shaken vigorously with a solution of 0.66 g. (0.00083 mole, ⅓ equivalent of pyridine in 2.0 ml. of water). GLC analysis of the organic layer showed that no starting material remained. The methylene chloride phase was separated, dried over magnesium sulfate, and evaporated, leaving 0.32 g. (71% yield) of a pale yellow liquid. This material was further purified by short-path distillation, B.P. 45–50° C. (5 mm. Hg). The product, a clear colorless liquid was a mixture of syn and anti isomers. IR and NMR analyses confirmed the structure.

One may also prepare N,N,N'-trifluorohydroxyacetamidine acrylate by converting 2,2-bis(difluoroamino)ethanol to N,N,N'-trifluorohydroxyacetamidine and thereafter esterifying with acrylyl chloride in the conventional manner.

EXAMPLE 6

N,N,N'-trifluorohydroxyacetamidine $$HOCH_2\overset{\overset{NF}{\|}}{C}-NF_2$$

To 0.25 g. of 2,2-bis(difluoroamino)ethanol in 0.25 g. of chloroform at 0° C. was added dropwise a solution of 0.04 g. of pyridine (⅓ equivalent) in 0.25 g. of chloroform. The mixture turned light yellow, and a white precipitate formed after 10 minutes. The reaction mixture was cooled to −10° C. and quickly filtered. The product (filtrate) was purified by preparative GLC (10 foot x ⅜ inch 20% SE–30 column) at 70° C. to give 0.13 g. of clear, colorless liquid which was a very strong lacrymator. The structure was confirmed by IR and NMR analyses.

EXAMPLE 7

N,N,N'-trifluorohydroxyacetamidine acrylate $$CH_2=CHCOOCH_2\overset{\overset{NF}{\|}}{C}-NF_2$$

One can form the desired ester by using any of the conventional esterification techniques such as the one used in Example 4.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. Monomers of the formula $$\begin{matrix}R_1 & R_3 & NF \\ \diagdown & | & \| \\ C=C-COCH_2-C-NF_2 \\ \diagup & \| \\ R_2 & O\end{matrix}$$

wherein $R_1$, $R_2$ and $R_3$ vary independently and are selected from the group consisting of H and lower alkyl.

2. A monomer of claim 1 which is N,N,N'-trifluorohydroxyacetamidine acrylate.

3. The compound $$CF_3\overset{\overset{O}{\|}}{C}OCH_2CH-(NF_2)_2$$

4. The compound $$HOCH_2\overset{\overset{NF}{\|}}{C}-NF_2.$$

5. The compound $$\begin{matrix}R_1 & R_3 \\ \diagdown & | \\ C=C-COCH_2CH-(NF_2)_2 \\ \diagup & \| \\ R_2 & O\end{matrix}$$

wherein $R_1$, $R_2$ and $R_3$ vary independently and are selected from the group consisting of H and lower alkyl.

6. The compound of claim 5 which is 2,2-bis(difluoramino)ethyl acrylate.

7. A process for the production of the compounds of claim 1 comprising:

(a) contacting $HOCH_2-CH(OC_2H_5)_2$ with trifluoroacetic anhydride to obtain $$CF_3\overset{\overset{O}{\|}}{C}OCH_2-CH-(OC_2H_5)_2;$$

(b) contacting $$CF_3\overset{\overset{O}{\|}}{C}OCH_2CH-(OC_2H_5)_2$$

with $F_2NSO_3H$ to obtain $$CF_3\overset{\overset{O}{\|}}{C}OCH_2CH-(NF_2)_2;$$

(c) contacting $$CF_3\overset{\overset{O}{\|}}{C}OCH_2CH-(NF_2)_2$$

with methanol to obtain $HOCH_2CH-(NF_2)_2$;

(d) contacting $HOCH_2CH-(NF_2)_2$ with $$\begin{matrix}R_1 & R_3 \\ \diagdown & | \\ C=C-CCl \\ \diagup & \| \\ R_2 & O\end{matrix}$$

to obtain $$\begin{matrix}R_1 & R_3 \\ \diagdown & | \\ C=C-COCH_2CH(NF_2)_2 \\ \diagup & \| \\ R_2 & O\end{matrix}$$

and thereafter contacting $$\begin{matrix}R_1 & R_3 \\ \diagdown & | \\ C=C-COCH_2CH-(NF_2)_2 \\ \diagup & \| \\ R_2 & O\end{matrix}$$

with pyridine and water to obtain $$\begin{matrix}R_1 & R_3 & NF \\ \diagdown & | & \| \\ C=C-COCH_2-C-NF_2 \\ \diagup & \| \\ R_2 & O\end{matrix}$$

8. A process for the production of the compounds of claim 1 comprising:

(a) contacting $HOCH_2-CH(OC_2H_5)_2$ with trifluoroacetic anhydride to obtain $$CF_3\overset{\overset{O}{\|}}{C}OCH_2-CH-(OC_2H_5)_2$$

(b) contacting $$CF_3\overset{\overset{O}{\|}}{C}OCH_2-CH-(OC_2H_5)_2$$

with $F_2N SO_3H$ to obtain $$CF_3\overset{\overset{O}{\|}}{C}OCH_2CH-(NF_2)_2$$

(c) contacting $$CF_3\overset{\overset{O}{\|}}{C}OCH_2CH-(NF_2)_2$$

with methanol to obtain $HOCH_2CH-(NF_2)_2$;

(d) contacting $HOCH_2CH-(NF_2)_2$ with pyridine and water to obtain $$HOCH_2\overset{\overset{NF}{\|}}{C}-NF_2$$

and (e) contacting $$HOCH_2\overset{\overset{NF}{\|}}{C}-NF_2$$

with $$\begin{matrix}R_1 & R_3 \\ \diagdown & | \\ C=C-CCl \\ \diagup & \| \\ R_2 & O\end{matrix}$$

to obtain $$\begin{matrix}R_1 & R_3 & NF \\ \diagdown & | & \| \\ C=C-COCH_2-C-NF_2 \\ \diagup & \| \\ R_2 & O\end{matrix}$$

(References on following page)

References Cited

UNITED STATES PATENTS

| | | | |
|---|---|---|---|
| 3,436,382 | 4/1969 | Reed, Jr. | 260—584 R X |
| 3,436,419 | 4/1969 | Rhodes | 260—584 R X |
| 3,439,039 | 4/1969 | Petry et al. | 260—584 R X |
| 3,564,054 | 2/1971 | Orlando | 149—109 X |
| 3,564,056 | 2/1971 | Engel et al. | 260—584 R |

LELAND A. SEBASTIAN, Primary Examiner

U.S. Cl. X.R.

149—19, 109; 260—487, 564 R, 584 R